US011328231B2

(12) United States Patent
Smith et al.

(10) Patent No.: US 11,328,231 B2
(45) Date of Patent: *May 10, 2022

(54) METHOD OF MATCHING EMPLOYERS WITH JOB SEEKERS

(71) Applicant: The Institute For Motivational Living, Youngstown, OH (US)

(72) Inventors: Bradley Paul Smith, Youngstown, OH (US); Sanford G. Kulkin, Fort Myers Beach, FL (US)

(73) Assignee: The Institute For Motivational Living, Boardman, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,102

(22) Filed: Apr. 9, 2021

(65) Prior Publication Data

US 2021/0264331 A1 Aug. 26, 2021

Related U.S. Application Data

(63) Continuation of application No. 12/776,569, filed on May 10, 2010, now Pat. No. 11,004,019.

(51) Int. Cl.
*G06Q 10/06* (2012.01)
*G06Q 10/10* (2012.01)
*G06Q 30/08* (2012.01)

(52) U.S. Cl.
CPC ....... *G06Q 10/06* (2013.01); *G06Q 10/06311* (2013.01); *G06Q 10/06398* (2013.01); *G06Q 10/1053* (2013.01); *G06Q 30/08* (2013.01)

(58) Field of Classification Search
CPC ............. G06Q 10/06; G06Q 10/06311; G06Q 10/1053
See application file for complete search history.

(56) References Cited

U.S. PATENT DOCUMENTS

| 7,184,969 B1 | 2/2007 | Bonnstetter et al. |
| 7,457,764 B1 | 11/2008 | Bullock et al. |
| 7,502,748 B1 | 3/2009 | Baldwin et al. |
| 7,640,200 B2 | 12/2009 | Gardner et al. |

(Continued)

OTHER PUBLICATIONS

Robert L. Morgan, Job matching: Development and evaluation of a web-based instrument to assess degree of match among employment preferences, Journal of Vocational Rehabilitation 29 (2008) 29-38 (Year: 2008).*

(Continued)

*Primary Examiner* — Andre D Boyce
(74) *Attorney, Agent, or Firm* — Haverstock & Owens, A Law Corporation

(57) ABSTRACT

A method of facilitating a match between an employer with at least one job opening and job seekers is provided. The employer has a set of position preferences related to the job opening. The job seekers have suitability data, resumes, etc., that are provided to the employer. The suitability data includes normalized assessment data. The method includes the steps of: determining a position quotient based on the position preferences; deriving a performance quotient for each job seeker, the performance quotient including normalized assessment data; comparing each the performance quotient to the position quotient; and ranking each the job seeker based on the comparison of the performance quotient to the position quotient.

30 Claims, 9 Drawing Sheets

(56) References Cited

U.S. PATENT DOCUMENTS

| | | | | |
|---|---|---|---|---|
| 8,090,725 B1* | 1/2012 | Cranfill | ............... | G06F 16/258 707/804 |
| 8,103,679 B1* | 1/2012 | Cranfill | ......... | G06Q 10/063112 707/804 |
| 8,296,179 B1* | 10/2012 | Rennison | .......... | G06Q 30/0251 705/14.53 |
| 8,375,026 B1* | 2/2013 | Elliott | ............... | G06Q 10/1053 707/728 |
| 2002/0055870 A1 | 5/2002 | Thomas | | |
| 2005/0080657 A1* | 4/2005 | Crow | .................... | G06Q 10/10 705/7.14 |
| 2006/0178896 A1 | 8/2006 | Sproul | | |
| 2006/0229896 A1 | 10/2006 | Rosen et al. | | |
| 2006/0229899 A1* | 10/2006 | Hyder | .................... | G06Q 10/10 705/321 |
| 2006/0265267 A1* | 11/2006 | Chen | ...................... | G06Q 10/10 |
| 2006/0265268 A1 | 11/2006 | Hyder et al. | | |
| 2006/0265269 A1* | 11/2006 | Hyder | ................ | G06Q 10/1053 705/321 |
| 2006/0265270 A1 | 11/2006 | Hyder et al. | | |
| 2007/0027859 A1* | 2/2007 | Harney | ................ | G06Q 10/02 707/999.005 |
| 2008/0071746 A1 | 3/2008 | Concordia et al. | | |
| 2008/0082384 A1 | 4/2008 | Berkerian et al. | | |
| 2009/0070126 A1 | 3/2009 | MacDaniel et al. | | |
| 2010/0125475 A1* | 5/2010 | Twyman | ................ | G06Q 10/00 705/7.42 |
| 2010/0131418 A1 | 5/2010 | McCagg et al. | | |
| 2010/0324970 A1 | 12/2010 | Phelon et al. | | |
| 2011/0238591 A1* | 9/2011 | Kerr | ................... | G06Q 10/1053 705/321 |
| 2011/0276507 A1* | 11/2011 | O'Malley | .............. | G06Q 10/00 705/321 |
| 2012/0023083 A1* | 1/2012 | McCagg | ................ | G06Q 10/10 707/706 |

OTHER PUBLICATIONS

Farzel-Zarandi et al., Semantic Matchmaking for Job Recruitment: An Ontology-Based Hybrid Approach, In Proceedings of the 3rd International Workshop on Service Matchmaking and Resource Retrieval in the Semantic Web at the 8th International Semantic Web Conference (Year:2009).

Jame E. Coverdill et al., Fit and Skill in Employee Selection: Insights form a Study of Headhunters, Qualitative Sociology, vol. 21, No. 2, 1998, pp. 105-127( Year 1998).

Yung-Ming Li et al., Incorporated Personality Trait With Support Vector Machine To Acquire Quality Matching of Personnel Recruitment, Institute of Information Management, National Chiao Tung University (Year:2008).

* cited by examiner

| Name | Assessment Date | Compatibility | Temperament | Team Focus | Work Values | Responsibility | Computer Skill | Contact Info | Resume |
|---|---|---|---|---|---|---|---|---|---|
| Enrico Pallazzo | 1/2/2010 | 43/44 | 12/12 | 5/6 | 6/6 | 10/10 | 10/10 | | PDF |
| Juliet Capulet | 1/15/2010 | 38/44 | 10/12 | | | | | | PDF |
| Jack Smith | 2/1/2010 | 32/44 | 9/12 | | | | | | PDF |

FIG. 6

METHOD OF MATCHING EMPLOYERS WITH JOB SEEKERS

RELATED APPLICATIONS

This Application is a continuation of U.S. application Ser. No. 12/776,569, filed on May 10, 2010, and entitled "METHOD OF MATCHING EMPLOYERS WITH JOB SEEKERS," which is hereby incorporated by reference.

BACKGROUND OF THE INVENTION

Field of the Invention

The disclosed and claimed concept relates to a method of matching job seekers and employers and, more specifically, to a method wherein a limited number of highly compatible job seekers are matched to an employer.

Background Information

Traditional methods of employers finding new employees, or for job seekers to find employers, typically consisted of the employer advertising a position and job seekers responding to the advertisement. The advertisement typically included a brief description of the minimal job requirements, e.g. a certain degree or a minimum experience requirement. The job seekers typically responded with a resume having a limited amount of information. If the applicant met the minimum requirements, a job interview may have been set up.

Today, employers have more tools at their disposal for determining whether a job seeker would benefit the employer. That is, in addition to resumes and interviews, various assessments and tests have been developed that provide an additional understanding as to how a person may function in general, at a particular task, how a person functions with others, etc. A job seeker may take these assessments independently and include such information along with a resume. That is, job seekers provide potential employers with "suitability data" which may include a resume, assessment results, references, and/or other information that indicates suitability for an available position.

Two drawbacks to this system are that (1) the various assessments are not standardized and, typically, produce dissimilar results, and (2) the elements of the suitability data are in different formats. With regard to the first point, one assessment may provide a result in the form of a score, e.g. a leadership score of 85 out of 100, whereas another assessment may provide a result in the form of a code, e.g. a personality type such as ANTJ or AXFP. Thus, it is likely that a job seeker may not have the right assessment as part of their suitability data. Additionally, employers may not rely on a specific assessment(s) but rather may have a list of position preferences that do not align with any specific assessment(s). With regard to the second point, even if all job seekers have been tested using the same assessment, employers may not know how to compare the value of an assessment score to the value of other suitability data, e.g. school pedigree or the ability to speak another language.

Further, with the advances provided by electronic communications, the number of job seekers aware of a given opportunity has increased dramatically. Thus, employers may be inundated with applicants. Conversely, when a job opening is not posted and the employer performs a search, on-line databases of resumes and other suitability data has vastly increased the number of job seekers that an employer may review. Accordingly, it is often difficult for employers to focus a search on the best candidates for a specific job.

It is noted that assessments, even those that produce a result in the form of a code, rely on multiple choice questions or questions involving ranking. For example, typical questions may be, "on a scale of 1-5, with 1 meaning strongly disagree and 5 meaning strongly agree, rank the following statements: (1) I work well in a group; (2) I like to work outside; (3) I like to work on a computer, etc." As many job seekers may try to guess the "right" answer, the assessments typically have more subtle questions. The point, however, is that such assessments often have raw data in the form of numerical data; this raw data is often easier to manipulate and/or convert to other formats.

Further, one exemplary assessment that is discussed below is a DISC assessment. The DISC assessment is not part of this invention, but an understanding of the assessment is helpful in understanding the disclosed invention. A DISC assessment requires a person to answer a series of questions, typically ranking questions such as those discussed above and/or a person's preferences in word associations. DISC is an acronym for: Dominance, Influence, Steadiness, and Compliance. Dominance relates to a person's preference for control, power and assertiveness. Influence relates to a person's style in social situations and how they communicate. Steadiness relates to a person's patience, persistence, and thoughtfulness. Compliance relates to a person's preference for structure and organization.

The DISC assessments are typically structured so that people who score high in the "D" category (Dominance) are very active in dealing with problems and challenges. Conversely, people with low "D" scores tend to want to research and gather data before committing to a decision. High "D" people are often identified as determined, ambitious, and pioneering. Alternatively, high "D" people may be described as strong willed, demanding, forceful, and egocentric. People with low D scores are typically described as mild, agreeable, low keyed, and cooperative, while also being conservative, and calculating.

People with high "I" scores (Influence) have the ability to influence others through talking and activity. Such people are often charismatic and convincing. They are also known to be trusting, optimistic, and may be demonstrative. Those with low "I" scores still have the ability to influence others; they just prefer to do so using different tools. That is, a low "I" score person would try to influence others by presenting data and facts, and would not rely on feelings. Low "I" score people are described as thoughtful, calculating, logical, and matter of fact. Such people also can be seen as critical, pessimistic, and skeptical.

People with high "S" scores (Steadiness) prefer predictability. Such people tend to be relaxed, patient, possessive, stable, unemotional and consistent. People with a low "S" score are those who like change and variety. Such people tend to be eager, impulsive, and restless.

People with high "C" scores (Compliance) like structure and play by the rules. They prefer to do a job once and do it well. Thus, people with high "C" scores tend to be careful, exacting, neat, and systematic. They are also known to be diplomatic and tactful. Those with low "C" scores are more rebellious and tend to challenge the rules. They prefer independence and are unconcerned with details.

Such assessments rate the subject as "possessing" or "lacking" with regard to a particular attribute being measured. For example, a certain position may be identified as a positive fit for someone who possesses a Dominant/Influencing style, e.g. a sales position. Someone who rates above the norm in the Dominant/Influencing categories probably possess the natural ability to succeed as a salesperson. A person who lacks these two attributes would probably have to work very hard to adapt and succeed as a salesperson. Further, the subjects can be rated as being "strong" or "weak" in their result. It is noted that some assessments choose to describe results with two different names, e.g. intellectual vs. emotional, as the nomenclature may produce a descriptive result that appears as an oxymoron. For example, a person who scores a "strong negative" on the influence scale of a typical DISC assessment is probably a person who relies on facts, rather than emotion, to make a point. The "strong lacking" does not mean the person lacks the ability to influence others, although that is what the description of a "strong lacking influence score" seems to imply.

As a short example, a DISC assessment may have the following three statements wherein the subject provides a scaled answer, e.g. with 1 meaning "strongly disagree," 3 meaning not sure or does not matter," and 5 meaning "strongly agree." Statement 1; I always use maps. Statement 2; I follow assembly instructions. Statement 3; I use a ruler to draw a straight line. Each of these statements relate to the "C" scores (Compliance). A person who answers with a 4 or 5 to these statements is probably a cautious, rule abiding personality and who would have a high "C" score. Conversely, a person who answered with low numbers is probably more radical. Someone who answered with 5's in both directions, or with middling ratings, is someone who is adaptable or unsure. Another way of scoring DISC assessments is to provide a series of sentences or statements and require the candidate to pick one statement that most resembles their behavior and one statement that is least like their probable behavior. Typically, DISC assessments used in the workplace provide 24-28 grouping of 4 statements each where the candidate is forced to choose the most/least applicable answer for each of the 24-28 groups.

The results of a DISC assessment are typically provided in the form of a line on a graph, as shown in FIG. 1. Just as there are no right or wrong answers on the assessment, there is not a "good" or "bad" line on the graph. As discussed above, the line on the graph relates to the strength and style of the subject. That is, the y-axis of the graph shows the intensity of the subject's results; the intensity may be "above" or "below" a neutral point. History has shown that, in many instances, people with similar results perform well in the same occupation or at similar tasks.

Further, the results of the separate attributes rated by such assessments may be combined to better evaluate the subject. As a simplified example, a person with high "D" and low "C" scores would probably be happier as a leader of an innovative company than as a military officer. That is, both are leaders, which is tied to a high "D", but a person who has a low "C" would probably dislike military regulation. As a further example, a person with a low "I" score and a high "S" or "C" score would probably be happier as a scientist than as an artist. Thus, in a DISC assessment, there are no wrong answers, but a person's answer may demonstrate that they are, or are not, a good fit for a particular job.

The fit between the subject of an assessment and an occupation is, typically, determined by plotting the DISC scores on at least one, and typically two or three graph(s). For example, one chart may plot a "public perception" of the subject. A public perception plot relates to those questions/ statements that the subject favored; i.e. the attributes the subject is likely to reveal in public. A second graph plots a "stress perception" and relates to those questions/statements that the subject disfavored. A subject would not typically disclose attributes that are not favored and would be stressed if placed in a situation wherein those attributes must be used. The two graphs may be combined, or averaged, in a third "self perception" graph.

The plots on the graphs establish a "performance line." That is, typically, employees, or satisfactory employees (as defined below), who perform well at a particular task or occupation have similar graphs. Moreover, when a number of subjects are assessed, it is possible to plot a standard deviation for each performance line. That is, it is unlikely that all the satisfactory employees are exactly alike, so the performance line may be expressed as a range of acceptable scores. On the graphs, this range is shown as shading, or another marking, about the performance line. That is, FIGS. 1A, 1B, and 1C show a Public Perception graph, a Stress Perception graph, and a Self Perception graph, respectively. The vertical axis relates to the intensity of the subjects' scores while the horizontal axis is merely divided into the DISC categories. As shown, each graph has a performance line 1. About the performance line 1 is an expanded area 2 representing the standard deviation. The standard deviation may be narrow, indicating that most subjects scored about the same for that particular category, or wide, indicating there was a broader range of answers from the subjects. When evaluating a job seeker, it is preferable that the job seeker has a score that falls within the standard deviation.

Finally, it is noted that there are many different DISC assessments which, while following the same basic structure, are developed independently of each other. Thus, DISC assessment scores, or any other type of assessment scores, may need to be normalized before the scores can be compared.

SUMMARY OF THE INVENTION

The disclosed and claimed concept provides for a method whereby a facilitator may facilitate a match between an employer with at least one job opening and job seekers by comparing a job seeker's performance quotient, which includes normalized assessment data, to a position quotient. The method allows the facilitator to screen a large number of job seekers so that only a limited number of highly compatible job seekers are matched to the employer.

The method enhances the number of job seekers in the initial pool by normalizing assessment data. That is, the method provides for normalizing assessments relative to each other, as well as assessment data and suitability data, so that the disparate qualities of the various job seekers may be compared simultaneously. Further, if job seekers have not participated in any relevant assessments, the method provides for administering one or more assessments to the job seekers or, more preferably, to a limited number of candidates selected from the pool of job seekers.

As noted, the assessments, or other suitability data, may be provided in incompatible formats. As this data may be normalized by a third party, such as, but not limited to, an employment website, the method in its simplest form provides for determining a position quotient based on position preferences set by the employer. That is, the employer provides a list of position preferences such as, but not limited to, a certain degree or certificate of training (i.e. hard attributes, as discussed below), a certain personality profile (i.e. soft attributes, as discussed below), and/or a minimum rating on a skills test. The facilitator converts the employer's position preferences to a position quotient, which is, preferably, a numerical value. It is noted that one method of converting the employer's position preferences to a position quotient is to have the employer's satisfactory employees take one or more assessments. The results of these assessments produce a "performance line." The performance line may be used as the, or part of the, position quotient.

The method further provides for deriving a performance quotient for each job seeker. The performance quotient may include hard attributes and always includes the normalized scores from one or more assessments as compared to the performance line. Again, it is preferable that the performance quotient is a numerical value. The method then provides for comparing each job seekers' performance quotient to the position quotient. For example, the position quotient may be reduced to a number, e.g. 100, which represents a plurality of position preferences. Various job seekers performance quotients would typically range from 0-100 (although the very low numbers would typically be screened out early in the process). Thus, once the job seekers' performance quotient is compared to the position quotient, it is easy to rank each job seeker based on the comparison of the performance quotient to the position quotient. Once the job seekers are ranked, the employer may choose to perform personal interviews with the top candidates.

As noted above, many assessments, even those that produce a result in the form of a code, rely on a multiple choice questions or questions involving ranking. The method provides for normalizing a subject's entire results, or, if details of the assessment are known, e.g. if it is known which questions/statements are linked, as discussed above, normalizing the raw data.

In a preferred embodiment, the facilitator provides the assessments to the job seekers. There are several advantages to this. For example, even when a job seeker does not take, or is not offered, a specific job, the facilitator may store the results. Thus, specific job seekers may not have to take an assessment each time there is a job opening for which they may be suitable. Further, the facilitator can structure the assessment to correspond, more or less, to the employer's position preferences.

The method is structured to identify the "best" job seekers for a specific job opening. In this context, "best" means that the new employee matches the desires of the employer. It is noted that this does not simply mean the most skillful. For example, an employer may be seeking employees that will stay with the employer for a long period of time, e.g. more than two years. Thus, a younger job seeker with up to date training but who is more likely to switch jobs after a short period may not be a better fit than an older job seeker with dated/less technological skills but who is likely to stay with the employer until retirement.

It is further noted that certain skills or attributes (identified in the employer's position preferences) may constitute a larger percentage of the typical work week for a certain position or be identified as more important by the employer. For example, some of the skills may not be the most critical to overall performance but, because these skills constitute a large percentage of the employee's time, they would be weighted heavily in the performance quotient. Conversely, other job skills may not be performed on a regular daily basis, but could be extremely critical. As such, even skills that are used infrequently could be weighted, as described below with respect to the step of weighting 198 information. An example of this might be a position such as an air traffic controller, who needs certain qualifications, education, experience, etc., all hard skills which are readily measured. However, how that person would act under extreme stress or pressure, even for brief periods of time, could only be identified by other types of communication, stress, management, or leadership-type soft skill assessments. How that person would react and communicate under extreme pressure may equate to lives lost or saved. Thus, the relevant soft skills would be weighted more heavily.

The method of matching qualified job seekers to an employer's job opening is preferably performed by an outside party, i.e. a facilitator. Further, the method preferably utilizes information that is available in an electronic format and that can be accessed remotely. That is, there are a large number of job seekers who have provided suitability data to both public and private forums on the Internet. Some estimates show over 100,000,000 resumes available at any given moment through various Internet sites and job boards. Regardless, the number is certain to increase and the odds of selecting the right candidates are diminished without a means to perform the tasks of providing a set performance goal and a way of assessing and normalizing scores to compare with this derived benchmark or performance line predicting success. The disclosed method allows the facilitator to reduce the number of job seekers presented to the employer. This may be accomplished without any action by the job seekers.

BRIEF DESCRIPTION OF THE DRAWINGS

A full understanding of the invention can be gained from the following description of the preferred embodiments when read in conjunction with the accompanying drawings in which:

FIG. 6 is a representation of the output provided to an employer

DESCRIPTION OF THE PREFERRED EMBODIMENTS

Figure 1C:
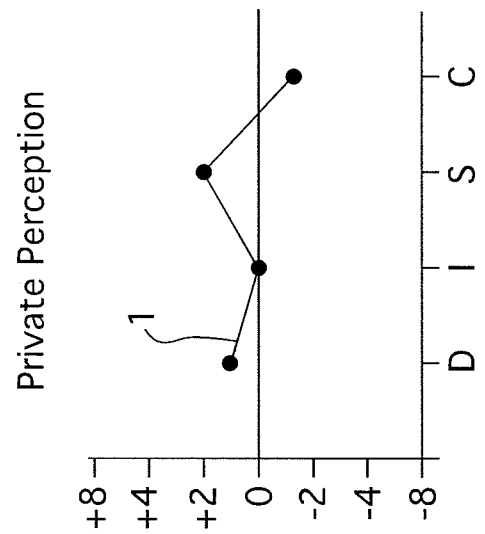
FIGS. 1A, 1B, and 1C are representations of an assessment output as a graph and having a performance line.
Figure 1B:
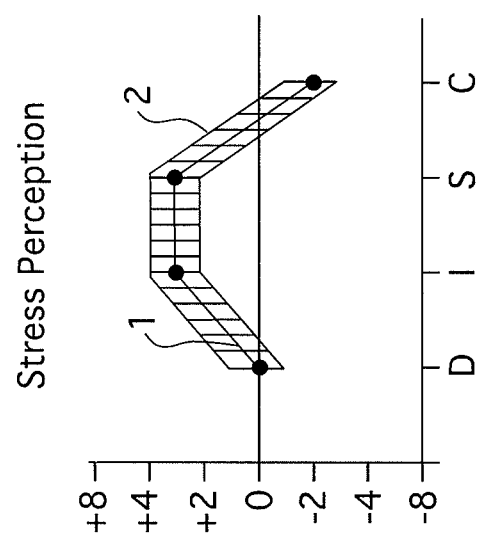
Figure 1A:
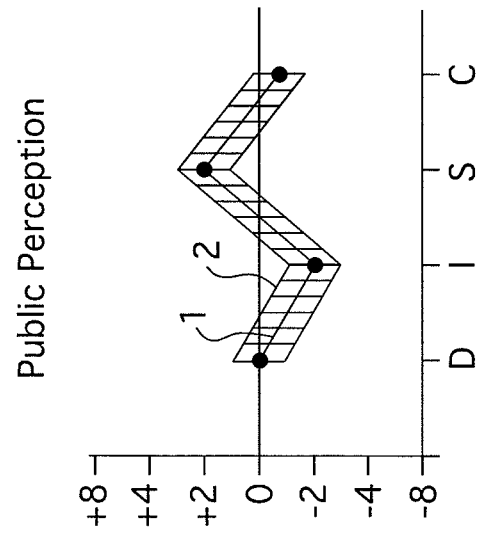

As used herein, "suitability data" includes resumes, assessment results, references, and/or other information that indicates a person's suitability for an available position.

As used herein, a "facilitator" may be independent of the employer, such as but not limited to, an independent contractor, or may be related to the employer, such as but not limited to, a human resources department or a single person tasked with screening job seekers.

As used herein, "employer" is any entity that employs others. An employer may be referred to as an individual or otherwise personified, but this is not limiting on the claims.

As used herein, a "job seeker" is any person who is looking for a job. The person may respond to a specific job posting or may simply provide their suitability data in a forum such as an Internet employment site. It is noted that, at the time this method was being developed, there were over one hundred million job seekers on various Internet employment sites.

As used herein, singular and plural nouns, e.g. "job seeker" and "employees," are used interchangeably and are not limiting upon the claims.

As used herein, "hard" attributes are skills, achievements, etc. that may be objectively identified. "Hard" attributes are, typically, recognized and/or documented by a third party, e.g. a school or training facility. For example, a degree or a training certification is evidence of a "hard" attributes. Further, any achievement that can be objectively measured or documented, e.g. "ten years experience," a minimum grade point average (GPA) or having an "honorable discharge," is a "hard" attribute.

As used herein, "soft" attributes are skills, achievements, etc. that cannot be objectively identified. Although "soft" skills may be assessed. Qualities such as, but not limited to, "leadership," "communication skills," and "compatibility" are examples of "soft" attributes. Generally, personality assessments and behavioral assessments are structured to measure "soft" attributes.

As used herein, a "behavioral assessment" means an assessment based on Jungian or other type of psychology dealing with human behavior and temperament traits which are observable in a workplace environment.

As used herein, a "base level" normalization is where the data being normalized is in a substantially standard format, but with minor differences. For example, some schools may include "+/−" as part of the GPA, i.e. an A+=4.3 points, A=4.0 points, A−=3.7 points, whereas other schools use the standard system of A=4.0 points, B=3.0 points, etc. A base level normalization could normalize these numbers by removing the points attributed to the "+/−." Conversely, a normalization wherein the data is in different formats, e.g. a percentile ranking compared to a percentile grade, or where the data is not in a standard format, is not subject to a "base level" normalization. It is specifically noted that assessments, such as, but not limited to, a DISC assessment, are not in a standard format.

As used herein, a "routine" or a "module," when used in the context of instructions on a computer means any set of executable instructions. It is understood that a "routine" or a "module" typically includes two or more related sets of executable instructions. For example, an Internet browser routine typically includes at least one interface module structured to present an interactive image on a display as well as a communications module structured to send and receive data. As such, it is understood that "routine" and/or "module" are collective words that may include a plurality of related "routines" or "modules."

Figure 2:
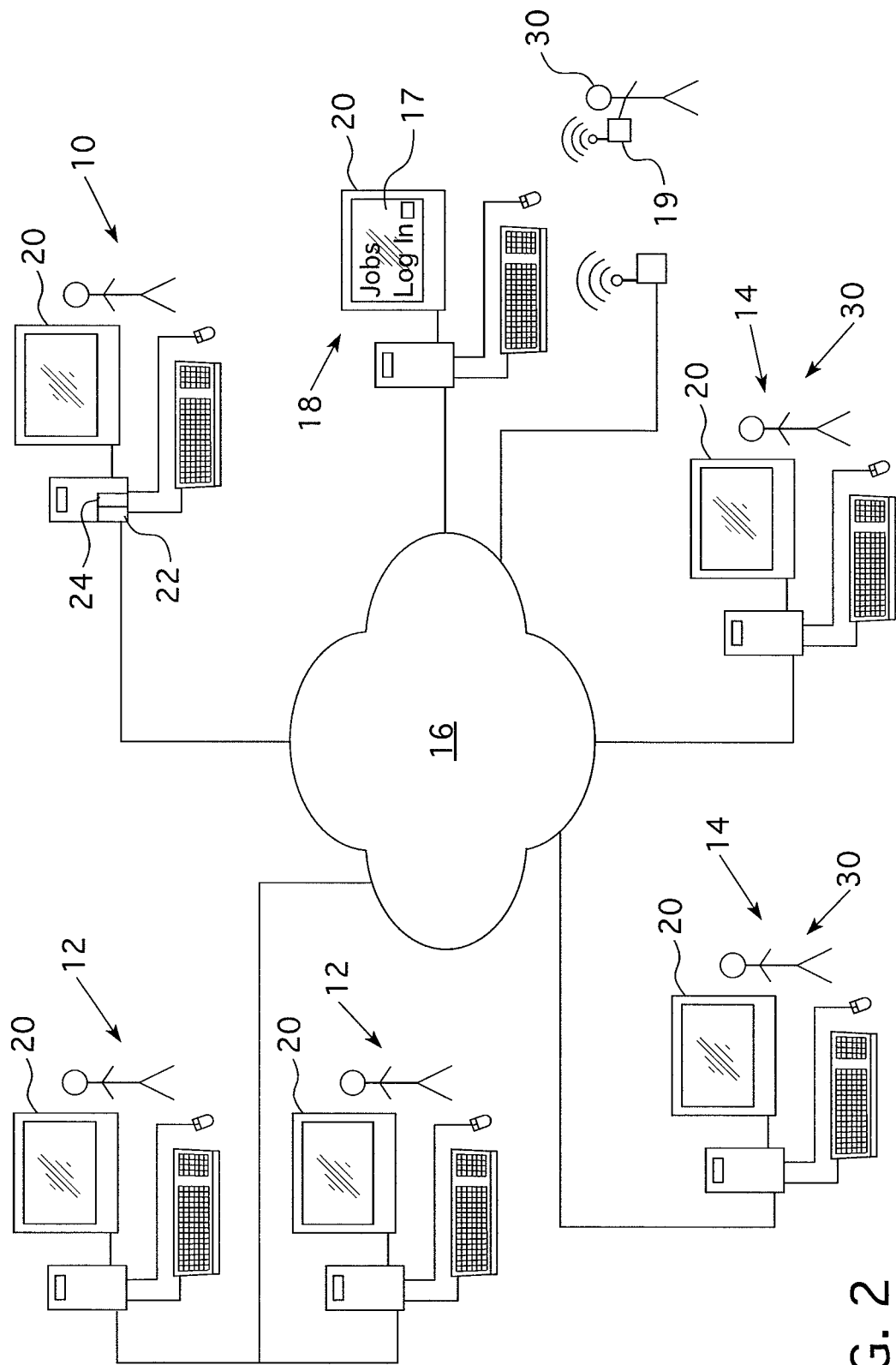
FIG. 2 is a schematic representation on the physical elements associated with the method, primarily an electronic network.

As shown in FIG. 2, the method relies on communication between a facilitator 10, an employer 12, and a plurality of job seekers 14. The employer 12 has at least one job opening, and, in the preferred embodiment, has requested that the facilitator 10 provide a list of qualified candidates. The list, preferably, is limited. That is, unqualified and less qualified candidates should be culled from the list prior to delivery to the employer. Preferably, most communication occurs over an electronic network 16 such as, but not limited to, the Internet. Thus, each participant 10, 12, 14, utilizes an electronic device 19 to access the Internet such as a handheld device or a computer 20 that is in communication with the electronic network 16. Further the method is implemented on the facilitator's computer That is, the steps described below are performed, i.e. executed, by the facilitator's computer 20, which is not a handheld device, and, more specifically, by at least one routine 22 stored on and executed by the facilitator's computer 20. Thus, it is understood that any reference to the facilitator 10, and to a lesser extent the employer 12, or the job seeker 14, performing an action or a step is an action/step performed on the identified party's computer 20, unless otherwise indicated. It is further understood that the identified computer 20 has a routine 22 structured to perform the identified step when the routine 22 is executed. For example, the statement that "the facilitator 10 performs a step of normalizing 120 assessment results" (see below), means that the facilitator 10 has on its computer 20 a routine 22 structured to "perform the step of normalizing 120 assessment results." Occasionally, as a reminder, this point will be noted below with a specific mention of a party's computer having a routine structured to perform a recited step. A lack of such a reminder, however, does not indicate that a step is performed in some other manner. As noted above, "routine" is a collective word and, unless otherwise noted, all routines shall be identified by reference number 22.

As is well known, the computer 20, or other electronic communication device, includes a processor, memory (typically both RAM and ROM), a storage medium (such as, but not limited to a hard drive or a solid state drive), input devices (keyboard, mouse, touch screen, etc.), and an output device (typically a monitor), as well as any other components required for electronic communication (modem, wireless communication, etc.) Further, the computer 20, or other electronic communication device, includes one or more routines 22, or modules, such as, but not limited to, an operating system, an Internet browser, and e-mail capability. All routines 22 are stored on a computer readable storage medium and are executed by/in the processor and/or RAM. As noted above, the job seekers 14 have, typically, provided suitability data (resumes, references, assessment results) to one or more third parties 18 such as, but not limited to, Internet employment sites 17. Such an Internet employment site 17 typically has a searchable database of the job seekers' 14 suitability data. That is, the Internet employment site 17 typically has a database routine that stores a plurality of files, or other storage construct, having data on job seekers 14 as well as a search routine structured to search the database, as is known in the art.

As detailed below, the method preferably includes steps of step of identifying 130 a first set of candidates whereby clearly unsuitable candidates are removed. Further, the method also preferably includes the steps of developing 154 the assessments and providing 166 the assessments to job seekers. The step of developing 154 the assessments, while typically performed on a computer 20, may be performed on another medium, e.g. the facilitator may initially draft the assessment on paper prior to input into a digital format. Further; these steps may be performed, typically in a limited fashion, by the employer or, more typically, by a third party 18 such as, but not limited to, Internet employment sites 17. That is, an Internet employment 17 site is typically structured to allow an employer 12 to filter search results, e.g. an employer 12 may identify all job seekers 14 on the site who have a degree in accounting. This is a type of first pass that culls unsuitable job seekers. Further, the third party 18 Internet employment site may perform a "base level" normalization of common resume elements, such as, but not limited to, grade point averages.

Figure 3:
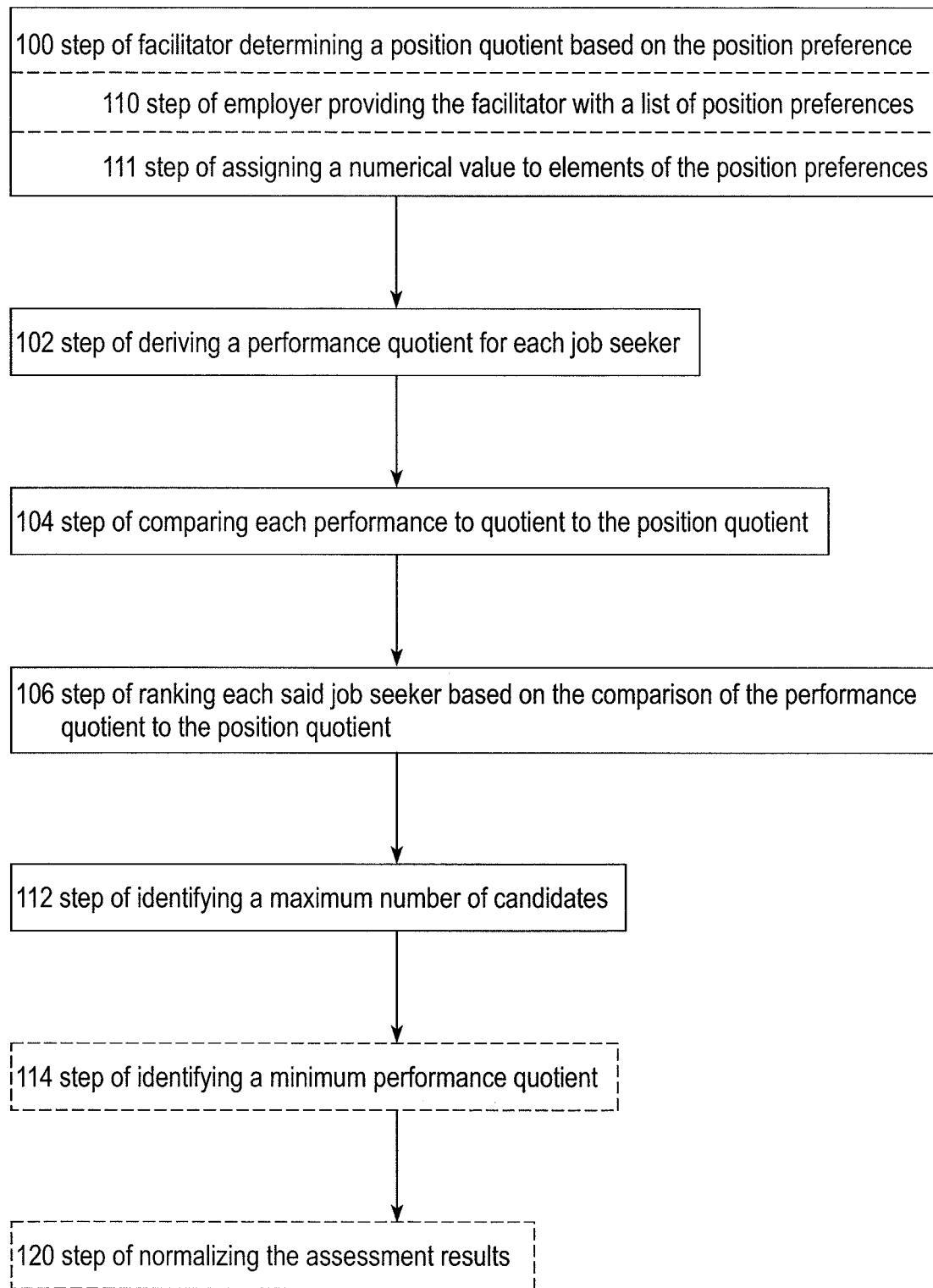
FIG. 3 is a flowchart of the steps associated with one embodiment of the invention.
Figure 4A:
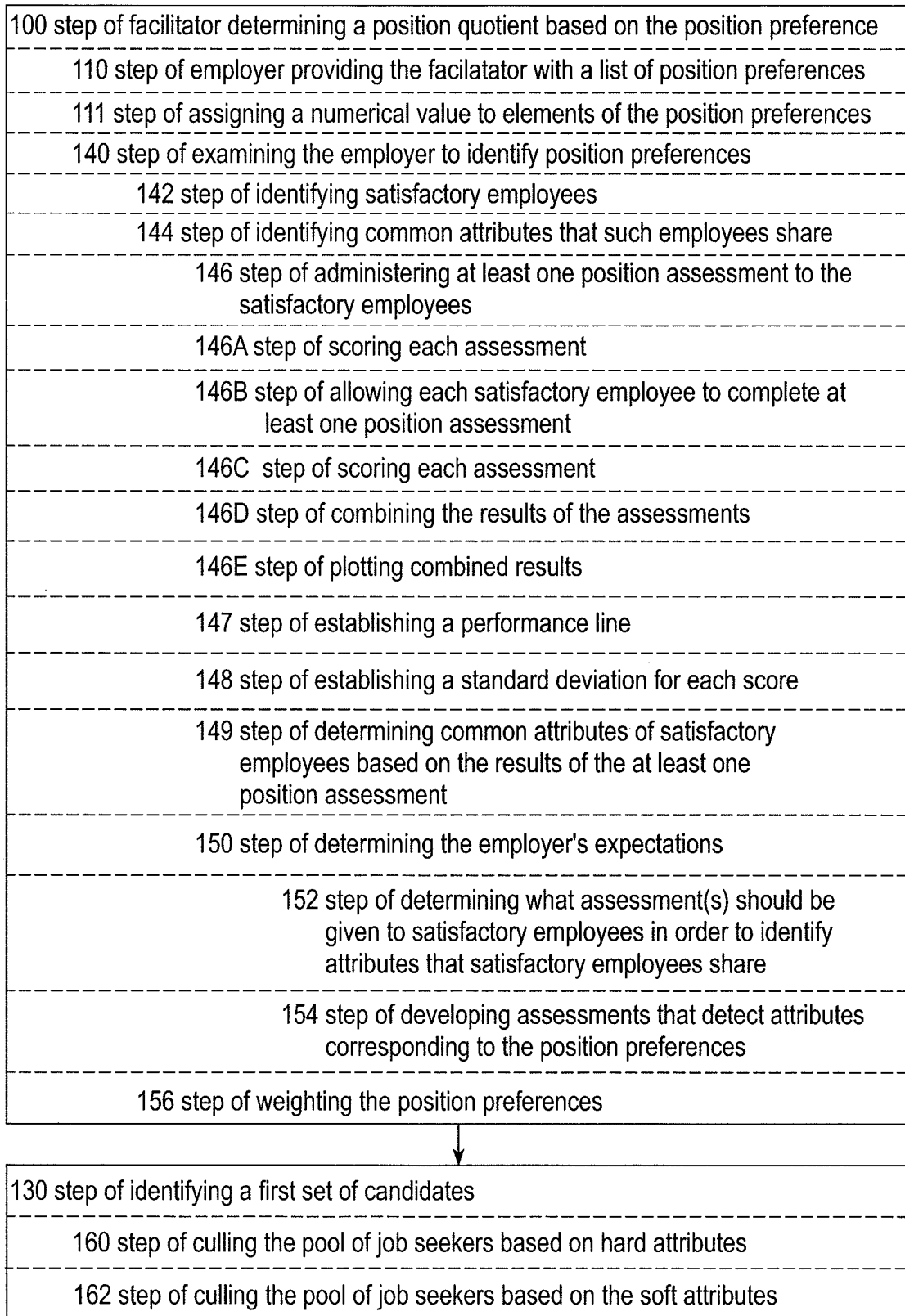
FIGS. 4A-4C are a flowchart of the steps associated with another embodiment of the invention.
Figure 4B:
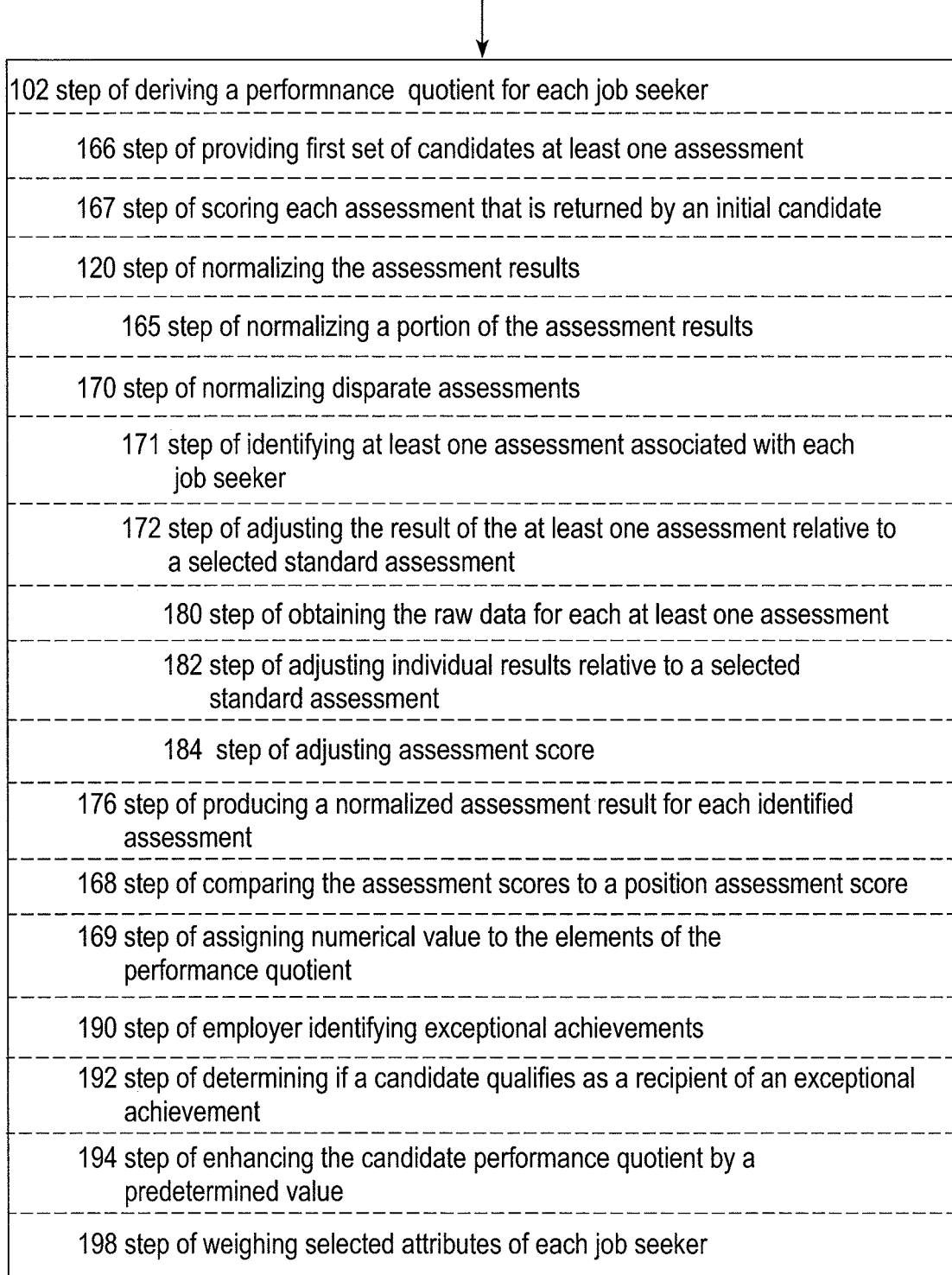
Figure 4C:
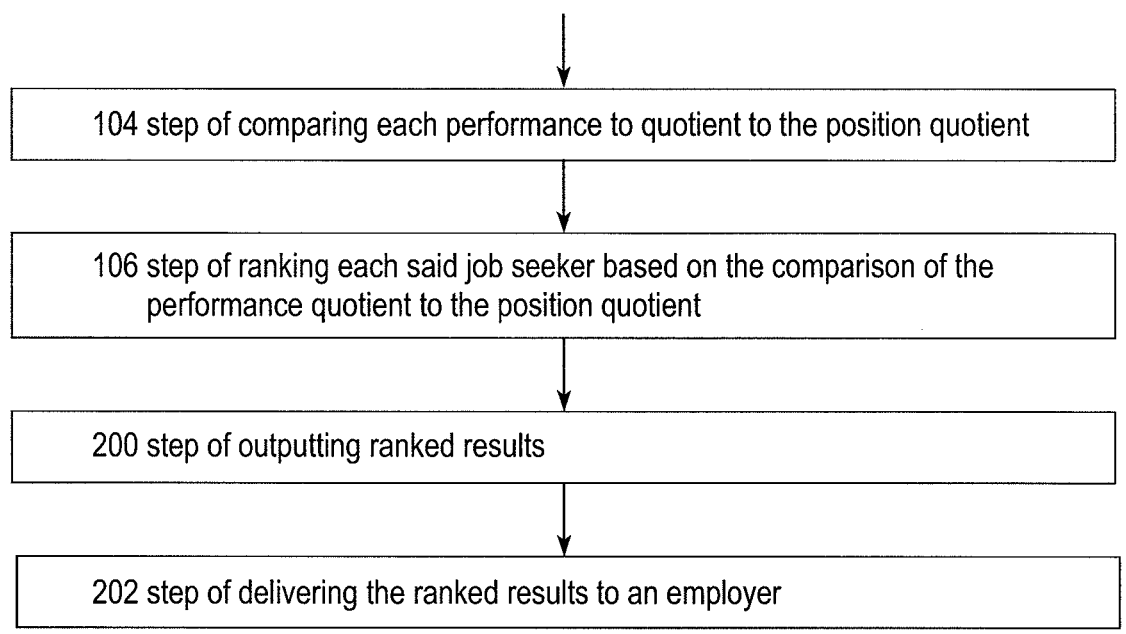

As shown in FIG. 3, one embodiment of the method includes the steps of determining 100 a position quotient 46 based on the position preferences; deriving 102 a performance quotient 48 for each job seeker, the performance quotient 48 including normalized assessment data; comparing 104 each performance quotient 48 to the position quotient 46; and ranking 106, i.e. determine a rank for, each said job seeker based on the comparison of the performance quotient 48 to the position quotient 46. Each of these steps are performed by the facilitator 10. That is, the facilitator's computer 20 includes a routine 22 structured to perform the steps of determining 100 a position quotient 46 based on the position preferences; deriving 102 a performance quotient 48 for each job seeker, the performance quotient 48 including normalized assessment data; comparing 104 each performance quotient 48 to the position quotient 46; and ranking 106, i.e. determine a rank for, each said job seeker based on the comparison of the performance quotient 48 to the position quotient 46.

As part of the step of determining 100 a position quotient 46 based on the position preferences, the employer 12, typically, provides 110 the facilitator 10 with a list of position preferences, e.g. minimum education, a preferred assessment result on a particular assessment "performance line," minimum experience, etc. It is noted that most communication steps, such as, but not limited to the step of the employer 12 providing the position preferences to the facilitator 10, while typically performed on, or via, the employer's computer 20 or other electronic device, may be performed via another medium, e.g. a postal service. The facilitator 10 determines 100 a position quotient 46 based on these position preferences. As noted below, the position quotient 46, as well as the performance quotient 48, are more easily manipulated when expressed as a numerical value. Thus, the step of determining 100 a position quotient 46 based on the position preferences typically includes the step of assigning 111 a numerical value to elements of the position preferences. These numerical values may be expressed as "points" within the position quotient 46. In the example below, the position quotient 46 is based on five assessments. To compare these disparate forms of suitability data the step of deriving 102 a performance quotient 48 for each job seeker, the performance quotient 48 including normalized assessment data, includes the step of normalizing 120 at least one behavioral assessment (in this case four behavioral type assessments plus one hard skills assessment.

Before discussing the method further, a few notes regarding behavioral assessments, and similar types of assessments, are in order. For the sake of this example, one behavioral assessment used will be a DISC assessment. DISC assessments may be structured to identify personality types, work habits and other such characteristics. Many such assessments are substantially similar and have been used by various parties for several years. Because these assessments are relatively common, no one party necessarily owns the rights to the assessment. These common assessments also are, typically, addressed to the same common characteristics. As used herein, such common assessments shall be identified as "core" assessments. Core assessments have a general applicability.

Other DISC assessments may be developed in relation to a type of occupation. While such assessments may follow the same basic pattern or method as a core assessment, there are typically one or more questions that relate to the associated occupation. Any assessment associated with a specific occupation is identified herein as an "occupation specific" assessment. The facilitator 10 may develop an assessment based on the position preferences and/or the position quotient 46 for a specific job opening or for a specific employer. An assessment developed by the facilitator 10 for a specific job opening or employer is identified herein as a "custom" assessment. Employers 12 may also have developed assessments for their private use. Such assessments may be related to hiring, retention of employees, or for evaluation purposes. These assessments are typically confidential and/or protected by copyrights. Such assessments are identified herein as "proprietary" assessments.

As discussed above and below, assessments, such as but not limited to a DISC assessment, result in one to three graphs having four data points each. Thus, such assessments are, preferably, assigned 111 a number of "points" equal to the number of data points that are plotted. Preferably, three graphs having four data points each are used. Thus, a DISC assessment is, preferably, assigned twelve (3×4) points. Thus, the assessment data is provided in a normalized format.

Returning to the method, the step of deriving 102 a performance quotient 48 for each job seeker, the performance quotient 48 including normalized assessment data, includes the step of normalizing 120 at least one behavioral assessment. Thus, the step of deriving 102 a performance quotient 48 for each job seeker 14 includes the step of comparing 168 the assessment scores of the job seeker 14 to the performance line 1 on three graphs. For this example, it is assumed that the performance line 1 has established or that a generic performance line 1 has been provided by the employer 12. A job seeker 14 is considered to match the performance line if the job seeker's 14 score is the same as, or within the standard deviation of, the performance line. For example, assume that the position assessment is a DISC assessment, from which the common attributes of satisfactory employees derived 148 a performance line on a public perception graph, as detailed above, having the following points "D=5, I=2, S=2.5, C=0.5" and a standard deviation at all points of +/−1.

For this example, a first job seeker 14 is assessed as having a public perception with points at "D=5, I=0, S=2, C=1" Thus, the candidate is at, or within the standard deviation, with respect to three of the four points. Thus, this candidate would have three points associated with the public perception graph incorporated into their performance quotient 48. The first job seeker's scores as to the other graphs are calculated in a similar manner. For the sake of this example it is assumed that the first job seeker 14 has six out of the possible twelve points associated with the DISC assessment. Further, assume that a second job seeker 14 has ten out of the possible twelve points associated with the DISC assessment. Thus, both job seekers' assessment data (results) are provided in a normalized format, preferably as a number. Further, assume the only position preferences supplied by the employer 12 is an advanced education and high grades. This may or may not be a legal method for determining job fit unless it can be proven that high grades correlate directly to job performance. This example is included to show the flexibility of the invention for normalizing assessments scores and other candidate data. The facilitator 10 may determine 100 a position quotient 46 by assigning 111 top tier schools a "value" of 2 "points," average schools 1 point, and unaccredited schools 0 points. It is noted that rankings, such as "top tier," appear to be a subjective determination, identifying such schools may be accomplished subjectively using various public ratings or, for example, by having the employer 12 identify those schools that it believes are "top tier." Similarly, a doctorate degree may be assigned a value of 4 points, a masters degree may be assigned a value of 3 points, a bachelor degree may be assigned a value of 2 points, and an associate degree may be assigned a value of 1 point. Further, the facilitator 10 also assigns points for a normalized GPA, as discussed above. If appropriate, the GPA score may simply be incorporated into the position quotient 46. That is, a GPA may be between 0 and 4.0 "points." Thus, the maximum number of "points" is "10" (2+4+4). That is, for this example, the position quotient 46 is 10 points. It is noted that this too is a number.

Continuing with the example above with the first and second job seekers 14, assume, that the first job seeker 14 graduated with a masters degree (3 points) from the Massachusetts Institute of Technology (a top tier school=2 points) and a GPA of 3.5; the first job seeker 14 would have 8.5 (3+2+3.5) "points" to be added to their performance quotient 48. Assume further that the second job seeker 14 graduated with an associate degree (1 point) from an unaccredited school (0 points) and a GPA of 3.2. The second job seeker 14 would have 4.2 (1+0+3.2) "points" to be added to their performance quotient 48.

As the assessment scores and the education related suitability data are expressed as numbers, the numbers may be added to derive 102 the performance quotient 48 for each job seeker, wherein the performance quotient 48 including normalized assessment data. Thus, in this example the first job seeker 14 has a performance quotient 46 of 14.5 (6+8.5) and the second job seeker 14 has a performance quotient 48 of 14.2 (10+4.2). Each job seekers' 14 performance quotient 48 may then be compared 104 to the position quotient 46, which, for ranking purposes, is equivalent to comparing the performance quotients 48 to each other, so that the job seekers 14 may be ranked 106. Accordingly, in this example, the facilitator 10 would likely recommend only the first job seeker 14 to the employer 12. Of course, with millions of job seekers 14 having suitability data available, the method would typically produce an extended list of ranked job seekers 14. The employer 14, or the facilitator 10, could reduce the length of this list by identifying 112 a maximum number of candidates and/or identifying 114 a minimum performance quotient 48.

The step of determining 100 a position quotient 46 based on the position preferences may include the step of weighting 156 the position preferences. That is, and continuing the example immediately above, the employer 12 may believe that the prestige of the job seeker's school is of more importance than the assessment data, the level of education, and the job seeker's GPA. To account for this position preference, both the position quotient 46 and the performance quotient 48 may be weighted. As noted above, various attributes may determine the number of "points" in the position quotient 46. When one, or more attributes, are considered to be more important than other attributes, the total value of that attribute may be increased by applying a multiplier to the favored attributes. Thus, in the example above, the facilitator 10 may weight 156 the position preference of "school" by multiplying its "point" value by two. In this example, the first job seeker's performance quotient 48 would be enhanced to be 16.5 points (6+(3+(2*2)+3.5)) and the second job seeker 14 has a performance quotient 48 would remain the same 14.2 (10+(1+(0*2)+3.2)).

It is noted that, as the job seekers' 14 suitability data is, preferably, in an electronic medium, and a routine 22 or algorithm may be created to perform the step of deriving 102 a performance quotient 48 for each job seeker. For example, and continuing with the example above, the facilitator 10 may have a routine 22 (shown schematically) on the computer 20 that has an associated database 24 (shown schematically) identifying top tier schools, average schools, and unaccredited schools. The routine 22 is further structured to identify the type of school that each job seeker 14 graduated from and add an appropriate number of points to the job seeker's performance quotient 48. The routine 22 is further structured to identify the highest level of education set forth in each job seeker's suitability data and assign the job seeker 14 an appropriate number of points, which are then added to the job seeker's performance quotient 48. Finally, the routine is structured to identify and record each job seeker's normalized GPA. The points associated with the each job seeker's normalized GPA are then added to each job seeker's performance quotient 48. Further, if the job seekers' 14 suitability data is already online, the step of deriving 102 the performance quotient 48 for each job seeker 14 may be performed without any intervention by the job seeker 14.

It is further noted that the processing of the position quotient 46 and the performance quotient 48, as well as the final step of ranking 106 the job seekers 14, is more easily accomplished if the position quotient 46 and the performance quotient 48 are expressed as numerical values. Thus, the facilitator preferably establishes the position quotient 46 as a numerical value and each performance quotient 48 as a numerical value. As described above, the position quotient 46 and the performance quotient 48 are expressed as having a number of "points." Further, as discussed below, the position quotient and the performance quotient each accounts for, and/or includes, several types of information and data, hereinafter "elements." As there is a comparison between the position quotient 46 and the performance quotient 48 the elements of each are, preferably, similar. That is, the elements of the position quotient 46 generally correspond to the elements of the performance quotient 48.

As stated above, this is a simple example wherein all the job seeker's 14 suitability data includes an assessment, the performance line 1 is predetermined, relevant suitability data is easily assigned a numerical value and wherein the higher the numerical value the better. A more complex example is set forth below. It is noted that any of the steps of the embodiment detailed below could be incorporated into the above embodiment of the method, such as, but not limited to, the step of administering 146 at least one position assessment to at least one satisfactory employee (discussed below).

Further, as each employer 12 is likely to have their own idea as to what makes an employee acceptable, this embodiment of the invention includes the step of administering 146 at least one position assessment to the satisfactory employees (discussed below) so as to establish a performance line 1.

In another embodiment, the facilitator 10 will perform several additional steps as detailed below. That is, the method includes the steps of determining 100 a position quotient 46 based on the position preferences; identifying 130 a first set of candidates; deriving 102 a performance quotient 48 for each job seeker, the performance quotient 48 including normalized assessment data; comparing 104 each performance quotient 48 to the position quotient; and ranking 106 each said job seeker 14 based on the comparison of the performance quotient 48 to the position quotient 46. That is, the facilitator's computer 20 includes a routine 22 structured to perform the steps of determining 100 a position quotient 46 based on the position preferences; identifying 130 a first set of candidates; deriving 102 a performance quotient 48 for each job seeker, the performance quotient 48 including normalized assessment data; comparing 104 each performance quotient 48 to the position quotient 46; and ranking 106 each said job seeker 14 based on the comparison of the performance quotient 48 to the position quotient 46.

Expanding upon these steps in turn, the following addresses the step of determining 100 a position quotient based 46 on the position preferences (and expands upon the simplified example set forth above). As noted above, the employer 12, typically, provides 110 the facilitator 10 with a list of position preferences. Some of the preferences are "hard," e.g. a minimum education, minimum experience, etc., and other preferences are "soft," e.g. a certain assessment result on a particular assessment. Other position preferences may be more vague or even unidentified by the employer. For example, a Nevada based employer 12 may hire based on hard attributes, e.g. top school and minimum GPA, but may not realize that only those employees who were born west of the Mississippi River stay with the employer 12. Thus, if the employer 12 is seeking a long term employee, birth place could be a position preference.

By way of a further example, an employer 12 may produce software wherein the original code was in a now defunct computer language, but is now produced in a current computer language. Thus, while knowledge of the defunct computer language is not required, those with such a knowledge may be better able to understand the employer's products. The employer 12 may identify knowledge of the current computer language as a position preference, but the facilitator 10 may note that knowledge of the defunct computer language as a position preference. As one more example, an employer 12, and more specifically an individual at the employer 12 under whom the job seeker 14 would be working, i.e. a supervisor, may have a military background. This supervisor may prefer working with others having a military background. Thus, a military background may also be a position preference. Accordingly, the step of determining 100 a position quotient 46 based on said position preferences may include the step of examining 140 the employer to identify position preferences.

In these examples, "place of birth," "knowledge of a defunct computer language," and "military background" are, or are in essence, hard achievements (if you do not believe place of birth is an achievement, talk to a Texan). Unidentified position preferences, however, are not typically as objectively identifiable as place of birth or other hard achievements, but rather tend to relate to soft attributes as identified above. That is, the employer 12 typically identifies the hard attributes as a minimum requirement that may easily be incorporated into the determination of 100 position quotient. Thus, while the step of examining 140 the employer to identify position preferences may reveal desirable hard attributes of which the employer 12 is unaware, the step of examining 140 the employer to identify position preferences will, typically, relate more to soft attributes.

One method of identifying such soft attributes is to identify employees with which the employer 12 is satisfied and to further identify common soft attributes that such employees share. It is noted that, while "satisfactory" is a subjective determination, identifying those employees which the employer 12 believes are "satisfactory" is an objectively achievable goal. That is, as used herein, one type of "satisfactory employee" is an employee whom the employer 12 informs the facilitator 10 is satisfactory. It is further noted that "satisfactory employees" may be related or limited to employees that are in positions similar to the open position. That is, as an example only, an employer 12 may have three supervisors and three assistants all of which perform their jobs in a satisfactory manner. If the job opening to be filled is an assistant position, the relevant "satisfactory employees" that would be identified are the assistants and not the supervisors. Thus, the step of examining 140 the employer to identify position preferences may include the steps of identifying 142 satisfactory employees and identifying 144 common attributes that such employees share.

Further, the employer 12 may identify a third party 18 as a "satisfactory employee." This would typically occur when a model employee has left the employer 12 and the employer is seeking similar workers. In this situation, the former employee may have already taken an assessment or the facilitator 10, or employer 12, may contact the former employee and request that the former employee take the position assessment. Further, the facilitator 10 may be able to identify workers who have consistently been evaluated as model employees and average, or otherwise combine, assessment results for those employees so as to create an average assessment for a generic satisfactory employee. Another type of "satisfactory employee" is a model based on prior data. That is, the facilitator 10 and/or third parties 18 may develop a model of a generic "satisfactory employee" having common attributes that successful employees share based on assessments and additional data from employers, e.g. reviews, data relating to retention, etc. Thus, while a satisfactory employee is typically a current or former employee of the employer 12, such a relationship is not a requirement.

As soft attributes, by definition, are not identifiable in the manner of hard attributes, the facilitator 10 may identify 144 attributes that satisfactory employees share by administering 146 at least one "position assessment" to at least one satisfactory employee(s). To differentiate between various assessments discussed herein, the assessments given to satisfactory employees and used to establish position preferences are identified as "position assessments." The step of administering 146 at least one position assessment to at least one satisfactory employee includes the steps of providing 146A the at least one position assessment to at least one satisfactory employee, allowing 146B each satisfactory employee to complete the at least one position assessment, scoring 146C each assessment, combining 146D the results of the assessments (if the assessment is administered to more than one employee), and plotting 146E the combined results, thereby establishing 147 a performance line 1. As discussed above, the scores are typically plotted 146E on two or three graphs. Further, while combining 146D the results of the assessments, it is preferable to establish 148 a standard deviation for each score, which may also be shown on the graphs. Thus, when the position assessment is a DISC assessment, the position assessment establishes a "performance line," or similar result. The standard deviation is used during the step of comparing 168 the assessment scores to a position assessment score, discussed below. The steps of establishing 147 a performance line and establishing 148 a standard deviation for the performance line may be identified as the step of determining 149 common attributes of satisfactory employees based on the results of the at least one position assessment.

It is noted that the step of providing 146A the at least one position assessment to each satisfactory employee, or "test taker," may be accomplished in a traditional manner, e.g. mailing a hard copy to each test taker, but is preferably performed via an electronic communication. More preferably, each test taker is provided with a URL link to a web page in an e-mail. The at least one assessment is presented on the web page associated with the link. The e-mail may include a unique identification so that, when each test taker accesses the web page via the e-mail, the facilitator may automatically identify and track data for each test taker.

Alternatively, the web page may require each test taker to sign in using a name and/or password, as is known in the art. The position assessment may then be completed on-line and automatically scored 146C. When two or more satisfactory employees have completed the at least one assessment, the steps of combining 146D the results of the assessments, plotting 146E the combined results, establishing 147 a performance line and establishing 148 a standard deviation may also be performed automatically. That is, the facilitator's computer 20 includes a routine structured to perform the step of administering 146 at least one position assessment to the satisfactory employees as well as each of the associated steps identified above.

As set forth below, there are multiple types of assessments upon which the facilitator 10 may rely. It is noted that some employers 12 may already have assessed one or more satisfactory employees. If so, the facilitator 10 may use an existing employee assessment as the "at least one position assessment". That is, acquiring the at least one position assessment from the employer 12 is equivalent to administering 146 at least one position assessment to the satisfactory employees.

In addition to, or in place of, administering 146 at least one position assessment to the satisfactory employees, the facilitator may also identify 144 attributes that are common to satisfactory employees by determining 150 the employer's expectations. That is, an employer 12 may be overly brief when initially identifying the position preferences. Thus, as part of determining 150 the employer's expectations, the facilitator 10 may interview, or otherwise communicate with, the employer 12 to determine in detail what the employer 12 believes the position preferences to be. It is noted that such an interview, or other communications, may also be used to determine 152 what assessment(s) should be given to satisfactory employees in order to identify 144 attributes that satisfactory employees share. That is, an employer 12 may initially state that it is looking for a job seeker 14 having an accounting degree and ten years experience. While examining 140 the employer to identify position preferences, the facilitator 10 may interview the employer 12, e.g. interview the supervisor under whom the job seeker 14 would be working, to determine 150 the employer's expectations. At such an interview, the facilitator 10 may learn that the job seeker will be working, essentially, alone and without supervision. Thus, the facilitator could choose to develop 154 assessments that detect attributes corresponding to the position preferences and give such similar assessments to satisfactory employees as described above.

When the at least one position assessment establishes 147 a performance line 1, a number of points are plotted. For example, in a DISC assessment that results in three graphs, there are twelve plot points; one point for each element (letter) of the assessment on each graph (4 points) multiplied by the number of graphs (3). It is noted that other assessments may have more or less plotted points and more or less resulting graphs. As noted above, it is easier to manipulate data that has been reduced to a numerical value. Thus, in this instance it is convenient to incorporate the number of plot points into the position quotient. That is, in this example, the DISC assessment generates twelve "points" in the position quotient 46. Similarly, other assessments that do not result in a performance line are also incorporated into the position quotient 46 as a numerical value. For example, an assessment of computer skills having twenty-five questions, and which is scored based on the number of correct responses, may be incorporated into the position quotient 46 as twenty-five "points." This is explained in more detail below.

The step of identifying 130 a first set of candidates 30 is useful for reducing the number of job seekers 14 to a smaller number. That is, and as noted above, the initial pool of job seekers 14 may include millions of individuals. This number can be reduced significantly by culling 160 the pool of job seekers 14 based on hard attributes. For example, the employer may identify a position preference that the job seeker 14 have a degree in accounting. As a limited number of the job seekers 14 will have such a degree, the initial pool of job seekers 14 is reduced to a more limited number of candidates 30. The step of culling 160 the pool of job seekers 14 based on hard attributes should be performed prior to the remaining steps of the method so as to not waste time and effort of those job seekers who will never meet the position quotient. The step of culling 160 the pool of job seekers 14 based on hard attributes may be, and in the preferred embodiment is, performed by, or partially performed by, a third party 18. That is, the facilitator 10 may access an Internet employment website 17, or similar electronic construct, which has a search routine 22. As is known, search routines 22 may be structured to return results based on an identified criteria. Thus, in a search routine 22 structured to operate with a resume database, a facilitator 10 may input a search criteria limiting the results to only those resumes indicating the job seeker 14 has an accounting degree.

It is noted that, typically, when a hard attribute that is not variable is required, e.g. a specific degree or certification, that attribute is not incorporated into the position quotient 46. That is, if all job seekers 14 (or candidates 30) must have the attribute, all job seekers 14 (or candidates 30) would receive the points for that attribute and, as such, including such points would not differentiate the job seekers 14. A variable hard attribute, e.g. GPA could still be incorporated into the position quotient 46.

The step of identifying 130 a first set of candidates 30 may also be accomplished by culling 162 the pool of job seekers 14 based on soft attributes. This, however, would only be effective if a number of job seekers 14 have assessment results, or similar soft attribute data, in their suitability data.

As noted above, the step of deriving 102 a performance quotient for each job seeker 14, the performance quotient including normalized assessment data may be performed when the job seekers 14 have assessment results, or similar soft attribute data, in their suitability data. As having assessment results, or similar soft attribute data, in suitability data is not the norm, yet, the facilitator 10 may enhance the odds of finding a suitable job seeker 14 by providing assessments to the job seekers 14. Assessments may be provided to the job seekers 14 in the same manner as assessments are provided to satisfactory employees, as discussed above. That is, in this instance, the job seeker 14 is the "test taker." As the pool of job seekers 14 may be very large, it is more efficient to perform the step of identifying 130 a first set of candidates 30 and then provide the assessments to the larger pool of job seekers 14. That is, the step of deriving 102 a performance quotient 48 for each job seeker 14 may include the steps of providing 166 at least one assessment to each said initial candidate 30, scoring 167 each assessment that is returned by an initial candidate 30, and normalizing 120 the assessment results, i.e. normalizing the assessment data. That is, in this context, the assessment results are data. Further, partial results are also data.

Typically, for a specific job, each initial candidate 30 would be provided the same at least one assessment. Thus, a single type of assessment would not require the results to be normalized relative to each other. The candidates 30 may, however, have or develop multiple assessments in their suitability data. That is, for example, while assessment results are not commonly included in suitability data, this does not mean that absolutely no job seekers 14 have assessment results included in suitability data. Further, using this method, an initial candidate 30 may be provided 166 an assessment, but then fail to gain the employment associated with that assessment. The data from that assessment could, however, be incorporated into the job seeker's/initial candidate's 14, 30 suitability data. Alternatively, the facilitator 10 could maintain their own records, including the assessment results, and have those records associated with, or incorporated into, the job seeker's/initial candidate's 14, 30 suitability data. Thus, over a period of time, various job seekers/candidates 14, 30 may have multiple assessments incorporated into, or associated with, their suitability data. As discussed below, such assessments may be different and, as such, the data related to the assessment may need to be normalized relative to each other so that a valid comparison may be made between assessments.

While there are common elements to such assessments, different assessments are created by different persons/organizations and many of the assessments are protected by secrecy and/or intellectual property laws. Thus, different assessments, typically, cannot be directly compared to each other.

The raw scores of the assessments may be normalized however. That is, the facilitator's computer 20 has a routine 22 thereon structured to normalize the assessments. The routine 22 is structured to adjust, or otherwise adapt, the results of any assessment to the facilitator's 10 standard. For example, one company's DISC assessment may include multiple questions relating to making rapid decisions. These questions may emphasize, i.e. cause the subject's results answers to be more extreme (stronger or weaker), a particular score in a manner different from the facilitator's standard DISC assessment. Or perhaps instead of administering a DISC type personality assessment an employer may use a Kiersey Temperament or an MMPI type behavioral assessment. Such assessments rate or rank various elements of communication, workplace personality, environmental preferences but all score on entirely different scales. In this instance, the routine 22 would be structured to reduce the value of that particular assessment's scores so that that assessment could be compared to various other assessments that would meet the facilitator's 10 standard for assessment.

If the raw data (e.g. the actual answer to each question as opposed to just the subject's final score) is available, the routine 22 could be structured to normalize individual responses. The routine 22 is structured to perform such an adjustment for each specific assessment relative to a selected standard.

Accordingly, the step of normalizing 120 the assessment results may include the step of normalizing 170 disparate assessments. The step of normalizing 170 disparate assessments includes the steps of identifying 171 at least one assessment associated with each job seeker 14, or initial candidate 30, adjusting 172 the result of the at least one assessment relative to a selected standard assessment, producing 176 a normalized assessment result for each identified assessment. The step of adjusting 172 the result of at least one assessment relative to a selected standard assessment may include the steps of obtaining 180 the raw data for each at least one assessment and adjusting 182 individual results relative to a selected standard assessment. Finally, it is noted that the step of normalizing 120 the assessment results may include the step of normalizing 165 a portion of the assessment results. That is, the facilitator 10 does not need to normalize 120 all of the assessment results, but rather only those assessment results that relate to the performance quotient 48 and/or the position quotient 46.

As noted above, assessments such as a DISC assessment do not rate the subjects as being right or wrong, but rather on a scale representing various styles. Thus, step of deriving 102 a performance quotient 48 for each job seeker 14 (or initial candidate 30) includes the step of comparing 168 the assessment scores of the job seeker 14 to a position assessment score. As noted above, when the position assessment is a DISC assessment, the position assessment results in a performance line on three graphs. A job seeker 14 is considered to match the performance line if the job seeker's 14 score is the same as, or within the standard deviation of, the performance line. For example, assume that the position assessment is a DISC assessment from which the common attributes of satisfactory employees derived 148 a performance line on a public perception graph, as detailed above, having the following points "D=5, I=2, S=2.5, C=0.5" and a standard deviation at all points of +/−1. A candidate 30 is assessed as having a public perception with points at "D=5, I=0, S=2, C=1" Thus, the candidate is with, or within the standard deviation, with respect to three of the four points. Thus, this candidate would have three points incorporated into their performance quotient 48.

As is known, the step of comparing 168 the raw assessment scores to a model assessment score is structured to determine which candidates 30 most closely match the desired score and is, preferably, performed after normalization 120 of the assessment results.

There are other assessments that do not produce a result in the form of a performance line 1 or assess a subject in the manner of a DISC assessment, or, a behavioral assessment having a performance line 1 may still produce a result in an incompatible format. With regard to the former, some assessments are similar to traditional tests that are scored on the number of correct answers relative to the total number of questions. Thus, some assessment results may be a simple number, e.g. 40 out of 50, or, 16 out of 20. Such raw scores may be normalized 120 by converting the scores to a percentage. Other assessments may be scored in a manner similar to most school tests, i.e. on a scale from 1-100 wherein an average subject is about 70%-80% correct and exceptional subjects are above 90% correct. Similar assessments may be scored in a similar manner, but be structured to be harder, e.g. an average subject is about 50%-60% correct and exceptional subjects are above 70% correct. These types of assessments results may also be normalized 120 as part of the step of deriving 102 a performance quotient 48 for each job seeker 14. In this simple example, the normalization 120, or the step of adjusting 172 the result of the at least one assessment relative to a selected standard assessment, is accomplished by increasing or decreasing the at least one assessment score relative to the facilitator's 10 standard.

For example, assume that the facilitator 10 and a third party 18 each have an assessment relating to the ability to speak French, i.e. a French test. The average score on the facilitator's 10 test (FT) is 70% whereas the third party 18 test (TPT) has an average score of 50% and no one scores above 70%. The step of adjusting 172 the result of the at least one assessment relative to a selected standard assessment may be a simple algorithm such as FT=1.4*TPT. Of course, and is known in the art of mathematics, the normalization algorithm is typically more complicated.

As with the DISC assessments, if the facilitator 10 has access to the questions/statements and the job seeker's 14 answers that comprise the assessment, the normalization may be made more precise. For example, the facilitator 10 may eliminate selected questions/answers if the facilitator 10 believes that the selected questions/answers are irrelevant, inaccurate, or for any other reason.

With regard to the behavioral assessments that have results in different formats, e.g. an assessment may produces twenty data points as compared to the twelve point DISC assessment discussed above, normalization 170 may occur as follows. That is, the step of adjusting 172 the result of the at least one assessment relative to a selected standard assessment, may be accomplished by adjusting 184 the assessment result relative to a selected standard assessment, e.g. increasing or decreasing the "point" value of the non-standard assessment. For example, the assessment data for a candidate 30 who received sixteen out of twenty points (i.e. sixteen out of twenty scores were within the standard deviation of a performance line on one or more graphs) could be normalized 170 by multiplying the result by 0.6 ($^{12}/_{20}$), e.g. sixteen points*0.6 provides a normalized score of 9.6. Further, if the assessment measured a specific aspect of the job seeker compared to the standard assessment, the "point" value of the other assessment data may be reduced by a selected factor. This is similar to the step of weighting 156 the position preferences discussed above. For example, if the standard assessment addressed four factors, e.g. the four DISC factors of Dominance, Influence, Steadiness, and Compliance, and the other assessment only evaluated a single factor, then the value of the score could be reduced by a factor of 0.25. That is, assuming that the other assessment result was relevant or somehow corresponded to the associated DISC score. If the other assessment is not directly relatable to the standard assessment, the facilitator 10 determines the adjustment factor.

Figure 5:
FIG. 5 is a representation of the different types of dissimilar assessments that a facilitator might choose to include in determining a person's suitability for any given position

As noted above, the facilitator's computer 20 has a routine 22 thereon structured to normalize the disparate assessments. The routine 22 is structured to adjust, or otherwise adapt, the results of any assessment to the facilitator's 10 standard. As shown in FIG. 5, the facilitator's computer 20 preferably includes a routine 22 having an interface 50 having a menu 52 of the assessments associated with the candidate 30. The facilitator 10 may select, e.g. by checking two or more boxes 54 adjacent the name of each assessment. The routine 22 will then normalize 120 the results of the identified assessments as described above.

As with the position quotient 46, the performance quotient 48 is, preferably, a numerical value. Accordingly, the step of deriving 102 a performance quotient for each job seeker 14 (or initial candidate 30) includes a step of assigning 169 a numerical value to the elements of the performance quotient 48. It is noted that this is done in a manner that corresponds to the numerical value to the elements of the position preferences that are the basis of the position quotient 46, with at least one exception noted below. That is, if the position preferences include an assessment that provides twelve "points," as discussed above, to the position quotient 46, the performance quotient 48 should also include an assessment, the same assessment or a different assessment that has been normalized 170, that provides twelve "points" to the performance quotient 48. It is further noted that, by reducing the various elements of the performance quotient 48 to numerical values, disparate types of data are being normalized 120.

One possible exception to the rule set forth immediately above is an option to include additional "points" in the performance quotient 48 for exceptional achievement. There would, typically, not be a corresponding value in the position quotient 46. Thus, a candidate 30 who was an exceptional match to the employer's position preferences and who has an exceptional achievement may have a performance quotient 48 that is greater than the position quotient 46. Thus, an employer 12 may identify 190 any exceptional achievements, including the value of such an achievement, that may be incorporated into the candidate's 30 performance quotient 48. It is expected that such exceptional achievements would be vary rare and notable, e.g. a Nobel Prize, Congressional Medal of Honor, but may be less rare, e.g. an Eagle Scout or Girl Scouts Gold Award. Of course, exceptional achievements need not be so widely known and many vocations will have exceptional achievements that have limited exposure outside of the field.

Such exceptional achievements are likely to be identifiable on the candidate's resume or another list of achievements. Thus, the facilitator 10 determines 192, i.e. a routine 22 on the facilitator's computer is structured to determine 192, if a candidate 30 (or job seeker 14) qualifies as a recipient of a special achievement. If so, the facilitator 10 may enhance 194 the candidate's 30 performance quotient 48 by a predetermined value, i.e. a set number of "points" is incorporated into the candidate's 30 performance quotient 48. The step of deriving 102 a performance quotient 48 for each job seeker 14 (or initial candidate 30) may also include a step of weighting 198 selected attributes of each job seeker 14 (or initial candidate 30). As noted above, the step of determining 100 a position quotient 46 based on the position preferences may include the step of weighting 156 the position preferences. If this is performed, the performance quotient 48 should be weighted in a similar manner. Thus, the step of deriving 102 a performance quotient 48 for each job seeker 14 (or initial candidate 30) may also include the step of weighting 198 elements of the performance quotient 48. That is, as noted above, the position preferences can be associated with elements of the position quotient 46, e.g. when the position preferences identify a specific preference as being important, e.g. a minimum GPA or "strong leadership abilities," there are corresponding elements in the position quotient 46. Each job seeker 14, and especially each initial candidate 30, should have qualifications that are similar, or correspond to, the position quotient 46. Thus, just as elements of the position quotient 46 may be weighted, elements of the performance quotient 48 may be weighted. That is, the facilitator may weight selected elements of the performance quotient 48 by enhancing those elements by a multiplier.

Once the performance quotient 48, or a weighted performance quotient 48, has been determined, each initial candidate 30 is compared 104 to the position quotient (or to each other) so as to determine 106 a rank, as discussed above. Finally, the ranked results are output 200 from the facilitator's computer 20, and provided 202 to the employer 12. Preferably, the results are delivered in an electronic format. In an electronic format, such as, but not limited to a spreadsheet, the employer 12 may manipulate the output. More specifically, a routine on the employer's computer 20 may resort and display the data as requested by a user. That is, as is known, the data may be displayed and sorted by various methods. As is also known, the data may also be structured to create links, or hyperlinks, to additional data or documentation, e.g. a link to an electronic copy of the candidate's resume.

The results are, preferably, in the form of a final ranking as shown in FIG. 6. That is, FIG. 6 shows an example of the output of the method described above. A brief description of this figure may help clarify the method. As shown on the left, each candidate 30 is identified by name 40. The candidates 30 are shown in ranked order from most suited to least suited for the job opening. The column labeled "compatibility" (after assessment date) provides an indication 41 of the candidate's score relative to the position quotient 46. As shown, this may be done in at least three ways; first and second, the shape and/or color of the indication 41. For example, the most compatible candidates 30 may have an indication that is a green circle 42a, less compatible candidates 30 may have an inverted triangle 42b (similar to a yield sign) and the least compatible candidates 30 may have a red octagonal shape 42c (similar to a stop sign). A third indication 41 may be a numerical representation of the candidate's performance quotient 48 relative to a numerical representation of the position quotient 46 disposed adjacent the geometric shape. The results may also display the individual elements of the position quotient 46 as well as each candidate's score relative to that element. As shown, the position quotient 46 includes at least five elements; temperament, team focus, work values, responsibility, and computer skills. In this example, the "temperament" value is based on a DISC assessment. Thus, as discussed above, the DISC assessment results in three graphs each having four points (as well as a standard deviation). Thus, as further detailed above, the "temperament" value was assigned 111 twelve points. The "team focus" and "work values" are based on assessments that result in single bar graphs each having six points (or on a scale that was weighted 156 to have a maximum of six points). Thus, the "team focus" and "work values" contribute six points each to the position quotient 46. For this example, the "responsibility" value is based on an assessment that has ten questions which is graded as a test, as discussed above, and which is not weighted. Thus, the "responsibility" value contributes ten points to the position quotient 46. Finally, the "computer skills" value is based on test-like assessment having one hundred questions. As this number is very large, and based on the employer's preferences, the "computer skills" is weighted 156, i.e. enhanced, by a factor of one tenth. Thus, the "computer skills" value contributes ten points to the position quotient 46. Thus, the position quotient 46 has a total of forty-four points. Further, just as each candidate's performance quotient 48 may be indicated by a geometric shape 42 or a numerical score, the candidate's score for each element may be displayed by similar indications.

Figure 7:
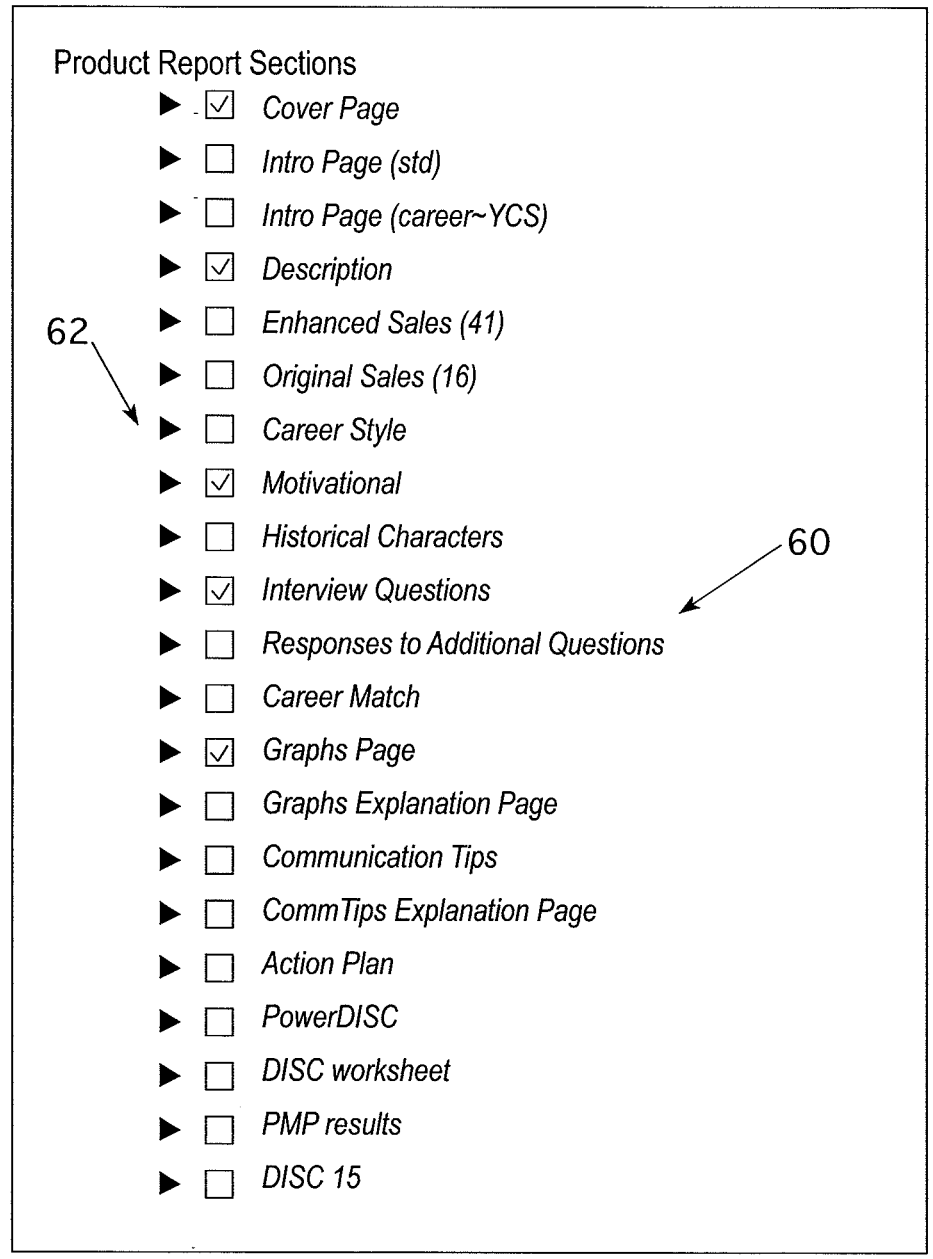
FIG. 7 is a representation of the different reports that can be generated by another embodiment of the invention.

Further, as noted above, the results may include, i.e. the routine 22 may be structured to output 200, additional information such as, but not limited to a link 49 to a stored document, such as but not limited to, a resume or the candidate's contact information. Thus, the employer 12 may easily access the additional information. Further, the output may include additional information related to the assessments or the candidate's 30 results. That is, the facilitator's computer 20 may include a database 24 having descriptions of each assessment, the actual assessments, a summary of what the assessment results mean, etc. When the output is provided 202 to the employer, the additional information may be included so as to give the employer context. Further, the additional information may be related to a specific candidate 30. For example, a graph showing the performance line 1 established by satisfactory employees, as well as a specific candidate's 30 results, may be provided to the employer 12. The additional information may be selected from a report generation interface 60 having a menu 62 as shown in FIG. 7. When the facilitator 10 selects items from the menu 62, the relevant items are attached to the information provided 202 to the employer 12. If the relevant items are specific to a candidate 30, the relevant candidate's data is retrieved and manipulated as required. That is, a routine 22 on the facilitator's computer 20 is structured to present the report generation interface 60. In response to the facilitator 10 selecting items from the menu 62, the routine 22 is further structured to attach the relevant items to a report provided 202 to the employer 12.

It is noted that the steps of deriving 102 a performance quotient for each job seeker 14; comparing 104 each performance quotient 48 to the position quotient 46; and ranking 106 each job seeker 14 based on the comparison of the performance quotient 48 to the position quotient 46 may be repeated multiple times. That is, just as the pool of job seekers 14 may be reduced to more limited first set of candidates 30, the method may include a step of identifying 131 a second (or third or fourth, etc,) reduced set of candidates 30. Each time the set of candidates 30 is reduced, the candidates 30 may be provided 166 with an additional assessment and the candidates may be re-ranked 106 based upon the new results.

For example, the pool of job seekers 14 online is estimated at one hundred million, a number that is, essentially, impossible to work with. A first set of candidates is identified 130 by limiting the results to those having a degree in accounting and a minimum GPA. As set forth above, these candidates are provided 166 at least one assessment and are eventually ranked 106 as set forth above. If the list of candidates 30 is still to long, and/or if the first culling 160 was intended to be one of a plurality of culls, the candidates 30 are again culled 162 based on a criteria selected by the facilitator 10 and/or the employer 12. Typically, this criteria will be based upon the ranking, e.g., the top one hundred candidates 30. This second reduced set of candidates 30 may be assessed again, typically with a different and/or more detailed assessment, and a new/updated performance quotient is derived 102. The second reduced set of candidates 30 is again ranked and presented to the employer 12. As noted, these steps may be repeated many times until the employer 12 is satisfied that the pool is not too large, or otherwise unsuitable, for review.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of implementing a facilitator module on a facilitator device that enables the facilitator device to match an employer having one or more employees and at least one job opening to one or more job seekers, said method comprising:
   determining a position quotient for the job opening with the facilitator module by:
      receiving, by the facilitator module, selection of one or more non-numerical position preferences for the job opening;
      assigning numerical position preference values for each of the one or more non-numerical position preferences;

multiplying one or more of values of the position quotient by at least one weighting value with the facilitator module;

determining a performance quotient for each of the one or more job seekers with the facilitator module by:
inputting non-normalized suitability data of the one or more job seekers with the facilitator module; and
converting the non-normalized suitability data into normalized assessment data with the facilitator module by selecting a standard assessment and conforming all of the non-normalized suitability data to the standard assessment;

ranking each of said one or more job seekers with the facilitator module with respect to both the job opening and each other by determining if values of the performance quotient of the job seeker match the numerical position preference values of the position quotient;

and generating and providing a ranking document to a user on the facilitator device with the facilitator module, the ranking document illustrating the ranking of each of said one or more job seekers with respect to the job opening and to each other.

2. The method of claim 1 wherein each of said performance quotients is a numerical value.

3. The method of claim 1 wherein said non-normalized suitability data is stored in an electronic format on an electronic network.

4. The method of claim 1 wherein the determining of the position quotient includes:
administering and scoring at least one assessment to at least one employee of the one or more employees;
if at least two of the one or more employees take said at least one assessment, then combining the results of the assessments; and
plotting the combined results, thereby establishing a performance line.

5. The method of claim 4 wherein said at least one assessment is selected from the group including a core behavioral assessment and at least one from an occupation assessment, a custom assessment, and a proprietary assessments.

6. A facilitator device for matching an employer having one or more employees and at least one job opening to one or more job seekers, the facilitator device comprising:
a processor; and
a non-transitory computer-readable medium storing a facilitator module that when executed by the processor causes the facilitator device to perform a method comprising:
determining a position quotient for the job opening by:
receiving, by the facilitator module, selection of one or more non-numerical position preferences for the job opening;
assigning numerical position preference values for each of the one or more non-numerical position preferences;
multiplying one or more of values of the position quotient by at least one weighting value;
determining a performance quotient for each of the one or more job seekers by:
inputting non-normalized suitability data of the one or more job seekers; and
converting the non-normalized suitability data into normalized assessment data by selecting a standard assessment and conforming all of the non-normalized suitability data to the standard assessment;
ranking each of said one or more job seekers with respect to both the job opening and each other by determining if values of the performance quotient of the job seeker match the numerical position preference values of the position quotient; and
generating and providing a ranking document to a user on the facilitator device, the ranking document illustrating the ranking of each of said one or more job seekers with respect to the job opening and to each other.

7. The device of claim 6 wherein each of said performance quotients is a numerical value.

8. The device of claim 6 wherein said non-normalized suitability data is stored in an electronic format on an electronic network.

9. The device of claim 6 wherein the determining of the position quotient includes:
administering and scoring at least one assessment to at least one employee of the one or more employees;
if at least two of the one or more employees take said at least one assessment, then combining the results of the assessments; and
plotting the combined results, thereby establishing a performance line.

10. The device of claim 9 wherein said at least one assessment is selected from the group including a core behavioral assessment and at least one from an occupation assessment, a custom assessment, and a proprietary assessments.

11. A non-transitory computer-readable medium storing a facilitator module for matching an employer having one or more employees and at least one job opening to one or more job seekers, wherein when executed by a processor the facilitator module performs a method comprising:
determining a position quotient for the job opening by:
receiving, by the facilitator module, selection of one or more non-numerical position preferences for the job opening;
assigning numerical position preference values for each of the one or more non-numerical position preferences;
multiplying one or more of values of the position quotient by at least one weighting value;
determining a performance quotient for each of the one or more job seekers by:
inputting non-normalized suitability data of the one or more job seekers; and
converting the non-normalized suitability data into normalized assessment data by selecting a standard assessment and conforming all of the non-normalized suitability data to the standard assessment;
ranking each of said one or more job seekers with respect to both the job opening and each other by determining if values of the performance quotient of the job seeker match the numerical position preference values of the position quotient; and
generating and providing a ranking document to a user on the facilitator device, the ranking document illustrating the ranking of each of said one or more job seekers with respect to the job opening and to each other.

12. The non-transitory computer-readable medium of claim 11 wherein each of said performance quotients is a numerical value.

13. The non-transitory computer-readable medium of claim 11 wherein said non-normalized suitability data is stored in an electronic format on an electronic network.

14. The non-transitory computer-readable medium of claim 11 wherein the determining of the position quotient includes:
    administering and scoring at least one assessment to at least one employee of the one or more employees;
    if at least two of the one or more employees take said at least one assessment, then combining the results of the assessments; and
    plotting the combined results, thereby establishing a performance line.

15. The non-transitory computer-readable medium of claim 14 wherein said at least one assessment is selected from the group including a core behavioral assessment and at least one from an occupation assessment, a custom assessment, and a proprietary assessments.

16. A method of implementing a facilitator module on a facilitator device that enables the facilitator device to match at least one job opening of a job opening database to one or more job seekers of a job seeking database, said method comprising:
    determining a position quotient for the job opening with the facilitator module by:
        receiving, by the facilitator module, selection of one or more non-numerical position preferences for the job opening;
        automatically assigning numerical position preference values for each of the one or more non-numerical position preferences;
    determining a performance quotient for each of the one or more job seekers with the facilitator module by:
        inputting non-normalized suitability data of the one or more job seekers with the facilitator module; and
        converting the non-normalized suitability data into normalized assessment data with the facilitator module by selecting a standard assessment and conforming all of the non-normalized suitability data to the standard assessment;
    ranking each of said one or more job seekers with the facilitator module with respect to both the job opening and each other by determining if values of the performance quotient of the job seeker match the numerical position preference values of the position quotient; and
    generating and providing a ranking document to a user on the facilitator device with the facilitator module, the ranking document illustrating the ranking of each of said one or more job seekers with respect to the job opening and to each other.

17. The method of claim 16 wherein each of said performance quotients is a numerical value.

18. The method of claim 16 wherein said non-normalized suitability data is stored in an electronic format on an electronic network.

19. The method of claim 16 wherein the job opening is associated with an employer having one or more employees, and further wherein the determining of the position quotient includes:
    administering and scoring at least one assessment to at least one employee of the one or more employees;
    if at least two of the one or more employees take said at least one assessment, then combining the results of the assessments; and
    plotting the combined results, thereby establishing a performance line.

20. The method of claim 19 wherein said at least one assessment test is selected from the group including a core behavioral assessment and at least one from a job specific assessment, a custom assessment, and a proprietary assessment.

21. A method of implementing a facilitator module on a facilitator device that enables the facilitator device to match at least one job opening to one or more job seekers, said method comprising:
    identifying the one or more job seekers for the job opening with the facilitator module;
    determining a position quotient for the job opening with the facilitator module by assigning numerical position preference values for each of one or more non-numerical position preferences;
    determining a performance quotient for a subset of the one or more job seekers with the facilitator module by:
        inputting non-normalized suitability data including hard attributes of the one or more job seekers with the facilitator module;
        selecting the subset of the one or more job seekers based on the hard attributes of the suitability data of the one or more job seekers; and
        converting the non-normalized suitability data of the subset of the one or more job seekers into normalized assessment data with the facilitator module by selecting a standard assessment and conforming all of the non-normalized suitability data to the standard assessment;
    ranking each job seeker of the subset of the one or more job seekers with the facilitator module with respect to both the job opening and each other by determining if values of the performance quotient of each job seeker match the numerical position preference values of the position quotient; and
    generating and providing a ranking document to a user on the facilitator device with the facilitator module, the ranking document illustrating the ranking of each job seeker of the subset of the one or more job seekers with respect to the job opening and to each other.

22. The method of claim 21 wherein the determining of the position quotient includes inputting numerical position preferences.

23. The method of claim 22 wherein the job opening is of an employer having one or more employees and the inputting of the position preferences includes:
    identifying the one or more of the employees of the employer; and
    selecting attributes that the one or more of the employees share.

24. The method of claim 23 wherein selecting the attributes that the one or more of the employees share includes:
    automatically administering at least one assessment to the one or more of the employees; and
    determining common attributes of the one or more of the employees based on the results of said at least one assessment.

25. The method of claim 23 wherein selecting the attributes that the one or more of the employees share includes inputting employer's expectations data.

26. The method of claim 21 wherein the determining of the performance quotient for each of the one or more job seekers includes:
    normalizing disparate assessments by:
        identifying at least one assessment associated with each of the one or more job seekers of the subset of the one or more job seekers;
        adjusting the result of each of the at least one assessment relative to a selected standard assessment; and producing a normalized assessment result for each of the at least one assessment.

27. The method of claim 26 wherein said adjusting the result of each of the at least one assessment relative to the selected standard assessment includes:

inputting raw data for each of said at least one assessment, wherein the at least one assessment comprises a plurality of individual portions having individual results; and adjusting one or more of the individual results relative to a selected individual result standard assessment for the individual results.

28. The method of claim 21 wherein the determining of the position quotient includes weighting the position preferences and generating one or more of the performance quotients includes weighting elements of the one or more of the performance quotients.

29. The method of claim 21 further including outputting the ranked results from the facilitator device.

30. The method of claim 21 further comprising:
if said employer has identified any exceptional achievements:
determining if one or more of the job seekers qualifies as a recipient of a special achievement; and
if so, adjusting the performance quotient of the one or more of the job seekers the by a predetermined value.

* * * * *